Patented May 15, 1934

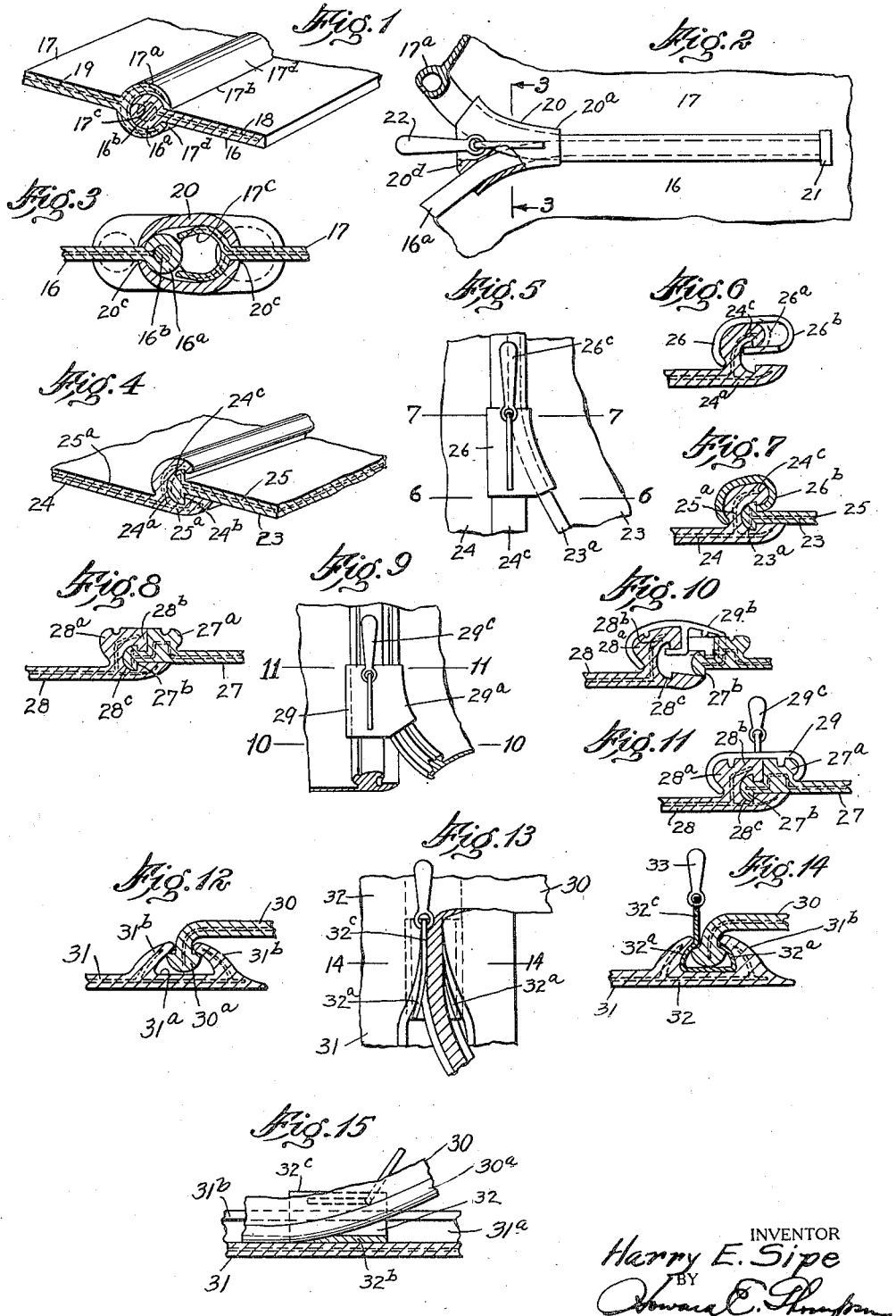

1,959,319

UNITED STATES PATENT OFFICE 1,959,319

FASTENING DEVICE

Harry E. Sipe, New York, N. Y., assignor to Hookless Fastener Company, Meadville, Pa., a corporation of Pennsylvania Application July 16, 1927, Serial No. 206,320
Renewed October 10, 1933

8 Claims. (Cl. 24—205)

This invention relates to fastening devices or devices for use in coupling and uncoupling two body members or parts, such as, the coupling of the flaps of a shoe or over-shoe or for joining two body parts together to prevent separation thereof as in body garments or other apparel, hand bags, cases and other containers; and the object of the invention is to provide a fastening device of the class described, the separate interlocking parts of which are composed of rubber or composition rubber and which include reinforcing and strengthening material to render such devices flexible when in use, and also to provide a water-tight or moisture-tight coupling between the parts; a further object being to provide continuous, elongated rib and socket or male and female parts adapted to be brought together by a suitable slider, slidably engaging one or both of said parts and adapted to move the rib member into and out of engagement with the socket part in the movement of the slide member longitudinally of said parts; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a sectional and perspective view of one form of fastening device which I employ, showing the separate parts thereof coupled together.

Fig. 2 is a plan view of the structure shown in Fig. 1 showing a slider mounted thereon and in the operation of coupling the separate parts of the device together.

Fig. 3 is a section on the line 3—3 of Fig. 2.

Fig. 4 is a view similar to Fig. 1 but showing a modified form of device.

Fig. 5 is a plan view of the device shown in Fig. 4 and indicating the slider employed.

Figs. 6 and 7 are sections on the lines 6—6 and 7—7 of Fig. 5.

Fig. 8 is a sectional view of another form of fastening device which I employ.

Fig. 9 is a plan view of the structure shown in Fig. 8.

Figs. 10 and 11 are sections on the lines 10—10 and 11—11 of Fig. 9.

Fig. 12 is a view similar to Fig. 8 but showing another modification.

Fig. 13 is a plan view of a part of the structure shown in Fig. 12 and indicating the slider employed.

Fig. 14 is a section on the line 14—14 of Fig. 13; and,

Fig. 15 is a sectional side view of the structure shown in Fig. 13.

In Figs. 1 to 3 inclusive, I have shown one form of fastening device consisting of two parts or strips 16 and 17, the strip 16 having at one edge and extending longitudinally thereof a bead or enlarged portion 16a substantially circular in cross sectional form and provided therein with a reinforcing and strengthening member 16b of flexible material such for example as cord, twine or a flexible cable or wire. The strip 17 is provided at one side edge and extending longitudinally thereof with a tubular or socket portion 17a which opens outwardly through its outer edge as seen at 17b to permit of the insertion of the projection or bead 16a into the socket 17c. The flanges 17d of the tubular portion 17a are adapted to encircle the projection 16a as seen in Fig. 1 of the drawing to securely lock the parts 16 and 17 together, and said flanges are flexible, permitting of the insertion of the projection 16a into the socket 17c.

The parts 16 and 17 are composed of flexible material, such for example as rubber or composition rubber and may also include fibrous material as indicated at 18 and 19. The fibrous material 19 extends into the flanges 17d to give strength and durability to said flanges, and yet permit of the flexing thereof for the purpose stated.

The parts 16 and 17 may be coupled and uncoupled by hand, by inserting the enlargement or bead 16a into the socket 17c but it is preferred that a coupling and slide member 20 be employed to couple and uncouple said parts, said slide member having a contracted end portion 20a and a diverging end portion 20b with channels opening through the sides of said slide member in the usual manner and as indicated at 20c. The channels intersect at the contracted end and are separated as seen at 20d at the diverging end of the device, said channels being formed to permit of the slidable engagement of the slider with the parts 16 and 17 and permitting the insertion of the bead part 16a into the socket 17c of the tubular part 17a, as indicated in Fig. 3 of the drawing. One end of the parts 16 and 17 may be attached or coupled together as seen at 21. In the movement of the slider 20 away from the coupled end as seen in Fig. 2 of the drawing, the parts 16 and 17 are coupled together, while the reverse movement of said slider will uncouple said parts. A finger piece 22 is mounted on the slider 20, and by means of which, the slider is operated in coupling and uncoupling said parts.

In Figs. 4 to 7 inclusive, I have shown a modification wherein the rubber part 23 is provided with a projecting bead or rib 23a semi-circular in cross sectional form adapted to enter the socket 24a of the female part 24. This part differs from the part 17 primarily in providing a heavy shoulder portion 24b engaging the end part of the bead or projection 23a, the shoulder 24b being substantially rigid and a flexible flange 24c engages the upper part of said bead or rib. In this construction, both parts are reinforced by suitable material 25 and 25a, the reinforcement 25 extending into the bead or rib 23a, while the reinforcement 25a extends into the shoulder 24b and flange 24c.

With the structure shown in Figs. 4 to 7 inclusive, I employ a slider 26 which slidably engages the flange portion 24c of the part 24. This slider is provided at one end, that is to say, its diverging end, with a hook-shaped part 26a for engaging the flange 24c to raise the same upwardly to permit of the insertion of the bead portion 23 into the socket 24a, and with another hook-shaped part 26b which engages the bead 23a of the part 23 and guides it into the socket 24a. It is understood that the member 26a is but a short finger, whereas the member 26b extends the full length of the slider and eventually encircles the free edge of the flange 24c as seen in Fig. 7 of the drawing, when the parts 23 and 24 are coupled together. From the foregoing, it will be apparent that the slider 26 does not extend onto the lower faces of the parts 23 and 24, but slidably engages the flange 24c. A finger piece 26c is employed for actuating the slider.

In Figs. 8 to 11 of the drawing, I have shown the separate parts 27 and 28 of a modified form of fastening device, which differs from the structure shown in Figs. 4 to 7 inclusive, primarily in that the inner end of the flange part 28a is provided with a square tongue 28b, which rests up against a projecting rib 27a on the part 27, and the enlargement or bead 27b of the part 27 enters the socket 28c in the part 28.

In this construction, the slider 29 slidably engages the parts 27a and 28a, the slider being flared as seen at 29a, Fig. 9 of the drawing, to guide the part 27a inwardly and to move the rib member 27b into the socket 28c in the manner indicated in Figs. 10 and 11 of the drawing. The flared end of the slider 29 has a finger 29b for raising the part 28b to permit of the insertion of the rib 27b into the socket 28c. The slider 29 is also provided with a finger piece 29c by means of which the same may be operated in coupling and uncoupling the parts 27 and 28.

In Figs. 12 to 15 inclusive, I have shown another modification, wherein two parts 30 and 31 are employed, the part 30 having a bead or enlargement 30a arranged at right angles to the free edge of said part, and extending longitudinally thereof, which is adapted to be placed in a socket 31a on the part 31, said socket opening upwardly or at right angles to the longitudinal plane of the part 31, and being formed by upwardly and inwardly extending flexible flanges 31b, which engage the shoulders of the enlargement or bead 30a to retain the parts 30 and 31 against displacement.

In this construction, a slider 32 is mounted to move longitudinally of the socket 31a and is of a cross section corresponding to the cross section of said socket, one end of the slider having upwardly and outwardly extending flared side portions 32a adapted to separate the flanges 31b of the part 31 as indicated in Fig. 13 to permit of the insertion and removal of the bead member 30a on the part 30. The slider is fashioned to receive the bead member 30a at one end thereof, and the opposite end is joined by a crosshead 32b which rests upon the bottom of the socket 30a. One side flange 32a is extended as seen at 32c and provided with an elongated aperture, in which the finger piece 33 of said slider is mounted.

In all the forms of construction shown, it will be seen that the separate members or parts of the fastening device consist of elongated strips, the adjacent or interlocking edges of which are provided with continuous rib and socket portions, with means slidably engaging one or both of the parts where coupled together, for permitting of the insertion of the rib or bead part into the socket part and the removal of the same therefrom. Likewise, the parts are all reinforced by any suitable material, such as fibrous material, or if desired, flexible metallic material may be employed, depending largely upon the specific use of the device and the strength of the coupling parts required when subjected to lateral pull or stress. Further, the several parts may be constructed in such manner as to permit of the free action of the several sliders employed on the rubber or composition rubber body or other flexible material employed in the construction of said parts, and also in the manner of constructing the separate sliders.

It will also be apparent that with a fastening device of the class described, the separate parts are secured to or may constitute part of the bodies or members in connection with which the same are employed. For example, they may be secured to or constitute part of the side flaps of a shoe or overshoe, the separate parts of a garment to be coupled together such for example as in coats, shirts, corsets, brassières and like garments, or in the construction of containers and like device, the coupling members may constitute an integral part of the device in the construction thereof, or secured thereto.

In addition to the flexibility produced by my improved fastening construction, a waterproof connection between the separate parts coupled together thereby, is produced, thus adding greater utility over other devices of this class employing metallic link members, between which are openings permitting of the free passage of water or moisture therethrough. It will also be understood that by virtue of the structure employed, destruction or breakage from bending or undue stress or strain is obviated, by virtue of the texture of the material employed.

It will be understood that while I have shown certain details of construction for carrying my invention into effect, and have referred to certain specific uses of the invention, that I am not necessarily limited in these respects, and various other changes in and modifications of the construction herein shown and described, may be made within the scope of the appended claims, without departing from the spirit of my invention or sacrificing its advantages.

Having fully described my invention, what I claim as new and desire to secure by Letters Patent, is:—

1. A fastening device of the class described comprising two continuous, elongated and interlocking strip-like members, one of said members terminating at its outer edge in an enlarged rib joining the remainder portion thereof by oppositely disposed shoulders, and the other member of said device having a longitudinal groove opening through its outer edge, the cross section of which corresponds to that of said rib, the side walls of said groove engaging said shoulder portions to prevent accidental displacement of said members when coupled together.

2. A fastening device of the class described comprising two continuous, elongated and interlocking strip-like members, one of said members terminating at its outer edge in an enlarged rib joining the remainder portion thereof by oppositely disposed shoulders, and the other member of said device having a longitudinal groove opening through its outer edge, the cross section of which corresponds to that of said rib, the side walls of said groove engaging said shoulder portions to prevent accidental displacement of said members when coupled together, and means slidably engaging said members for separating the side walls of the second named member to facilitate the coupling and uncoupling of said members.

3. A fastening device of the class described comprising two elongated, strip-like parts, the outer edge of one of said parts forming a longitudinal enlarged rib having shoulder portions arranged at opposite sides of said part, the other part having a continuous channel opening through the outer edge of said part and being of such cross sectional form as to receive and envelop the rib of the first named part, the side walls of said channel overlying said shoulder portions to prevent accidental displacement of said parts when coupled together, the side walls of the second named part being capable of flexure facilitating the attachment and detachment of the separate parts of the device, and means for reinforcing said walls.

4. A connector including a pair of strip-like members, a longitudinal bead on one member having a slot in its outer edge, said slot leading into an enlarged hollow interior, the sides of which taper toward the bottom thereof, a shoulder portion joining the slot with the hollow interior, a longitudinal bead on the other member, a longitudinal flange extending outwardly from said bead and an enlarged longitudinal projection on the outer end of said flange, said flange and projection being of the same cross-sectional dimension as the corresponding slot and hollow interior, a shoulder portion joining said flange and projection, said projection being receivable through the slot and in the hollow interior of the first named member, said members interlocking with each other by means of the aforesaid shoulder portions.

5. A fastening device of the class described comprising separate parts adapted to be coupled and uncoupled, said parts being molded out of rubber, one having a projection extending continuously along one edge and the other having means forming a continuous recess for receiving said projection, metal reinforcements in said member having the recess comprising metal wires bent around said recess and having their ends disposed adjacent the mouth of said recess so as to resist opening of the same, and metal reinforcements in said part having the projection comprising metal members in the body of said part and having portions extending into said projection.

6. A fastening device of the class described comprising two continuous elongated and interlocking strip-like members, one of said members terminating at its outer edge in an enlarged rib which forms adjacent the remainder portion of the strip, oppositely disposed straight sided shoulders having faces perpendicular to the plane of said strip-like members, and the other member of said device having a longitudinal groove opening through its outer edge, the cross section of which corresponds to that of said rib, the side walls of said groove being inherently flexible and engaging said perpendicular faces of said shoulder portions to prevent separation of said members when coupled together.

7. A fastening device of the class described comprising two continuous elongated and interlocking strip-like members each composed of flexible material and having cooperating fastening means on their outer edges, the fastening means of one member being adapted to interlock with the fastening means of the other member and thus prevent separation of said members when coupled together, and a slider slidably engaging said strip-like members, said slider comprising channels diverging in the plane of said members whereby the outer edges of said members carrying said fastening means are progressively brought into interlocking relation or separated in accordance with the direction of movement of said slider.

8. A fastening device of the class described comprising two continuous elongated and interlocking strip-like members, each of said members being composed of flexible and resilient material and having their outer edges formed to provide cooperating fastening means of said material integral with said members and in the same plane as the body portions of said members, fastening means on one member being adapted to engage with the fastening means of the other member for preventing the separation of said members when coupled together, and a slider having channels diverging in the plane of said members and being keyed to the edge portions thereof for flexing said edge portions and fastening means and bringing them progressively into interlocking relation or separating them in accordance with the direction of movement of said slider.

HARRY E. SIPE.